(12) United States Patent
Reif et al.

(10) Patent No.: US 8,879,829 B2
(45) Date of Patent: Nov. 4, 2014

(54) FAST CORRELATION SEARCH FOR STEREO ALGORITHM

(71) Applicant: Intel Corporation, Santa Clara, CA (US)

(72) Inventors: Dror Reif, Be'er-Yacoov (IL); Jacob Minsky, Haifa (IL)

(73) Assignee: Intel Corporation, Santa Clara, CA (US)

( * ) Notice: Subject to any disclaimer, the term of this patent is extended or adjusted under 35 U.S.C. 154(b) by 73 days.

(21) Appl. No.: 13/658,237

(22) Filed: Oct. 23, 2012

(65) Prior Publication Data

US 2014/0112572 A1   Apr. 24, 2014

(51) Int. Cl.
G06T 15/00   (2011.01)

(52) U.S. Cl.
USPC .......................................................... 382/154

(58) Field of Classification Search
None
See application file for complete search history.

(56) References Cited

U.S. PATENT DOCUMENTS

2007/0121998 A1*   5/2007   Stein .............................. 382/103

OTHER PUBLICATIONS

Andoni et al., "Near-Optimal Hashing Algorithms for Approximate Nearest Neighbor in High Dimensions", Communications of the ACM, vol. 51(1), Jan. 2008, pp. 117-122.
Indyk et al., "Near-Optimal Hashing Algorithms for Approximate Near(est) Neighbor Problem", www.stanford.edu/group/mmds/slides/indyk-mmds.pdf, retrieved on Oct. 16, 2012, 31 pages.
Baik et al., "Fast Census Transform-based Stereo Algorithm using SSE2", The 12th Korea-Japan Joint Workshop on Frontiers of Computer Vision, Feb. 2-3, 2006, pp. 305-309.
"Epipolar (Stereo) Geometry", www.cse.unr.edu/~bebis/CS791E/Notes/EpipolarGeonetry.pdf, Retrieved on Sep. 17, 2012, 16 pages.
Lifshits, "The Homepage of Nearest Neighbors and Similarity Search", http://simsearch.yury.name/, Retrieved on Oct. 16, 2012, 1 page.

* cited by examiner

Primary Examiner — Brian P Werner
(74) Attorney, Agent, or Firm — Finch & Maloney PLLC

(57) ABSTRACT

Techniques are disclosed for carrying our correlation search in contexts such as stereo algorithms of graphics systems. In accordance with an embodiment, the techniques employ a locality-sensitive hashing (LSH) function to reduce the number of bits to be processed during the correlation process, and to identify a sub-set of available image points that are likely to be the best match to a given target image point. Once such a sub-set of likely image points is identified, a more comprehensive correlation algorithm can be run, if so desired, to further ensure the quality of the match.

30 Claims, 7 Drawing Sheets

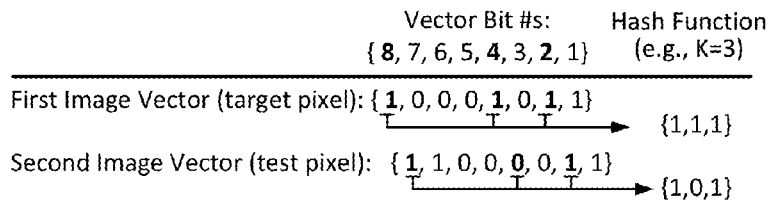

```
                          Vector Bit #s:      Hash Function
                          {8, 7, 6, 5, 4, 3, 2, 1}   (e.g., K=3)
First Image Vector (target pixel): {1, 0, 0, 0, 1, 0, 1, 1}
                                                          → {1,1,1}
Second Image Vector (test pixel):  {1, 1, 0, 0, 0, 0, 1, 1}
                                                          → {1,0,1}
```

Fig. 4a

Note: Hash Function may also be run on pixel descriptor.

Hash Table #1

| Hash Function (e.g., K=3) | X-coordinate for Second Image Pixels (e.g., row =256 pixels) |
|---|---|
| 0,0,0 | $X_{point41}$ |
| 0,0,1 | $X_{point30}, X_{point39}, X_{point44}, X_{point64}$ |
| 0,1,0 | $X_{point21}, X_{point55}$ |
| ⋮ | ⋮ |
| 1,1,0 | $X_{point1}$-$X_{point18}, X_{point23}$-$X_{point29}, \ldots X_{point255}$ |
| 1,1,1 | $X_{point19}, X_{point31}, \ldots X_{point256}$ |

Hash Table #2

| Hash Function | X-coordinate for Second Image Pixels |
|---|---|
| ⋮ | ⋮ |

⋮

Hash Table #L

| Hash Function | X-coordinate for Second Image Pixels |
|---|---|
| ⋮ | ⋮ |

Fig. 4b

FAST CORRELATION SEARCH FOR STEREO ALGORITHM

BACKGROUND

Depth extraction is fundamental in computer vision, and is a useful building block in perceptual computing for a variety of applications such as gesture tracking and face recognition. A stereo camera system is one of the techniques used for depth extraction. There remain, however, a number of non-trivial issues and limitations associated with depth extraction techniques.

BRIEF DESCRIPTION OF THE DRAWINGS

FIGS. 4a-b illustrate a fast correlation search for a stereo algorithm using locality-sensitive hashing for approximate nearest neighbor, in accordance with an embodiment of the present invention.

DETAILED DESCRIPTION

Figure 1:
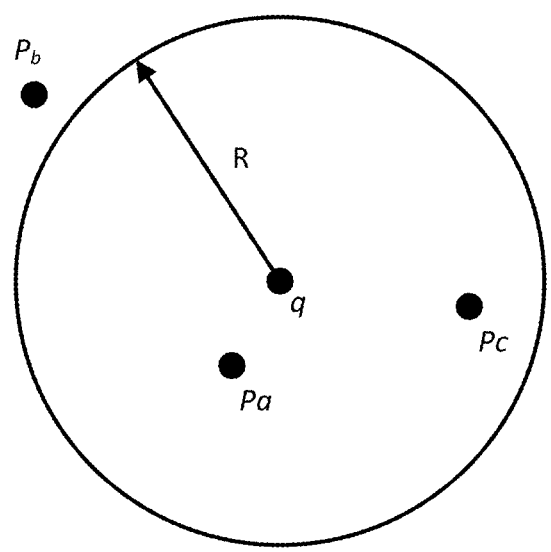
FIG. 1 graphically illustrates a nearest neighbor query.

Techniques are disclosed for carrying our correlation search in contexts such as stereo algorithms of graphics systems. In accordance with an embodiment, the techniques employ a locality-sensitive hashing (LSH) function to reduce the number of bits to be processed during the correlation process, and to identify a sub-set of available image points that are likely to be the best match to a given target image point. Once such a sub-set of likely image points is identified, a more comprehensive correlation algorithm can be run, if so desired, to further ensure the quality of the match.

General Overview

As previously explained, one of the techniques that can be used for depth extraction employs a stereo camera system. However, while such techniques are relatively cost effective with respect to materials, they generally place high demand on computing resources. One of the most computationally expensive parts of the stereo algorithm is the match or correlation of pixels from the first and second images of a stereo image pair. During this stage, for every pixel in the first image, a search for the best corresponding pixel in the second image is performed. The search is one-dimensional (on a line) and the search range is limited by the maximum disparity, which ideally should be above the half width of the image. So, the complexity is O(Height*Width^2). This represents a significant constraint. With typical approaches (e.g., pyramid, sub-sample, etc.), there is a tradeoff between the performance and output quality, and each technique has its own artifacts. In addition, real-time implementations of stereo camera based depth extraction (e.g., 30 frames per second, or FPS) are currently feasible only on hardware such as dedicated field programmable gate arrays (FPGAs) or application-specific integrated circuits (ASICs). Software-based solutions can reach near real-time performance, usually by implementing the stereo algorithm on a parallel computing platform such as CUDA™ by NVIDIA. However, there are various quality tradeoffs, and the performance is only near real-time.

Thus, and in accordance with an embodiment of the present invention, stereo matching techniques are provided to efficiently deal with the compute performance issue at the correlation stage. The techniques can also be combined with other existing techniques so as to speed them up or otherwise complement them in an overall stereo algorithm based depth extraction process. For instance, in some embodiments, the stereo matching techniques can be used to speed up a software implementation of a stereo algorithm so as to fully enable real-time performance on a given architecture. In accordance with an embodiment, a stereo correlation algorithm is provided that employs a locality-sensitive hashing (LSH) function. The LSH function is effectively used to reduce the number of bits to be processed during the correlation process and to identify a sub-set of available pixels which are likely to be the best match to a given target pixel.

For instance, and in accordance with one such embodiment, the correlation algorithm is carried out using a Local Binary Pattern or Census correlation function, which uses a Hamming distance between neighborhoods of points to define similarity. Each point can be represented by a vector. The value of the LSH function can be computed for all the points (using the vector of each point) on the epipolar line from the second image, and then the x-coordinate of each of those points can be placed into the hash table at the offset which is the value of the LSH function for that point. So, if the value of the LSH function for the given target point (from a first image of a stereo image pair) is X, then that offset (or index) X in the hash table can be queried to identify all the coordinates of all the points from the second image of the stereo image pair (on the same epipolar line) that have the same value of the LSH function (or a hash value within a given acceptable tolerance of that LSH function). A full correlation computation can then be carried out on that sub-set of points, thereby eliminating the need for full correlation processing on all the points of that epipolar line, in accordance with an embodiment. In some such embodiments, a family of hash functions is provided, wherein each LSH function represents a different set of bits from the vectors describing each of the points. Each LSH function can be used to construct a corresponding hash table. If even one of the LSH functions gives a match, a full computation can be performed on the point(s) found. Out of all the points checked, the one with the minimal distance (e.g., Hamming distance) from the target point can be selected.

FIG. 1 graphically illustrates an example nearest neighbor query. The nearest neighbor of the query point q is the point $P_a$. However, both $P_a$ and $P_c$ are near neighbors of q, in that they are at most a distance of R from q. In general, an LSH function is a hash function such that if points p and q are similar, then the probability that the hash function will return the same result on them is greater than probability P1, and if given points p and q are far from each other, then the probability that the hash function will return the same result is smaller than probability P2. In order for a locality-sensitive hash (LSH) family to be useful, it has to satisfy P1>P2.

As is known, this can be represented mathematically by: if $\|p-q\| \leq R$ then $\Pr_H[h(q)=h(p)] \geq P1$ (herein after Equation 1); and if $\|p-q\| \geq cR$ then $\Pr_H[h(q)=h(p)] \leq P2$ (herein after Equation 2); wherein H is a family of hash functions. In general, a hash function maps a space of objects (which may be vectors or descriptors or strings, etc) to a space of hash values, which is typically smaller than the space of the initial objects. In the context of stereo correlation processing as disclosed herein, for each pixel (or other point) in the first image, a search for the best correspondence in the second image is carried out (a search for the closest pixel under the correlation function metric is carried out). For instance, an entire one-dimensional line of pixels in the second image can be treated as a database, and an LSH-based stereo correlation algorithm can then query every pixel from the first image into this database, to find a similar pixel (or set of similar pixels) upon which a full correlation can then be computed, in accordance with an embodiment.

As will be further appreciated in light of this disclosure, use of an LSH function in the context of a stereo algorithm as disclosed herein enables a reduction in overall complexity from $O(Height*Width^2)$ to $O(Height*Width)$, in accordance with an embodiment. The exact resulting complexity depends on the particular hashing techniques chosen, but is generally far smaller than $O(Height*Width^2)$, in accordance with some such embodiments. Numerous variations and configurations will be apparent in light of this disclosure.

Methodology

Figure 2A:
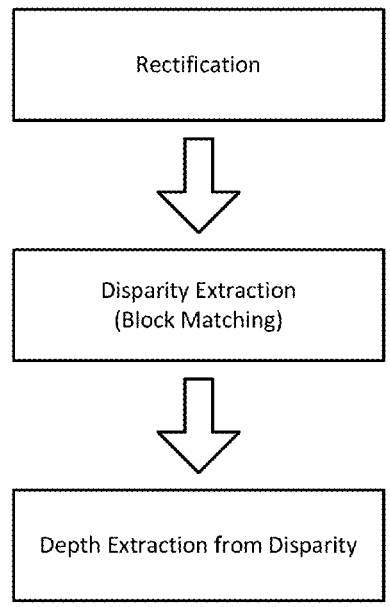
FIGS. 2a-b generally illustrate a stereo algorithm that can be configured in accordance with an embodiment of the present invention.
Figure 2B:
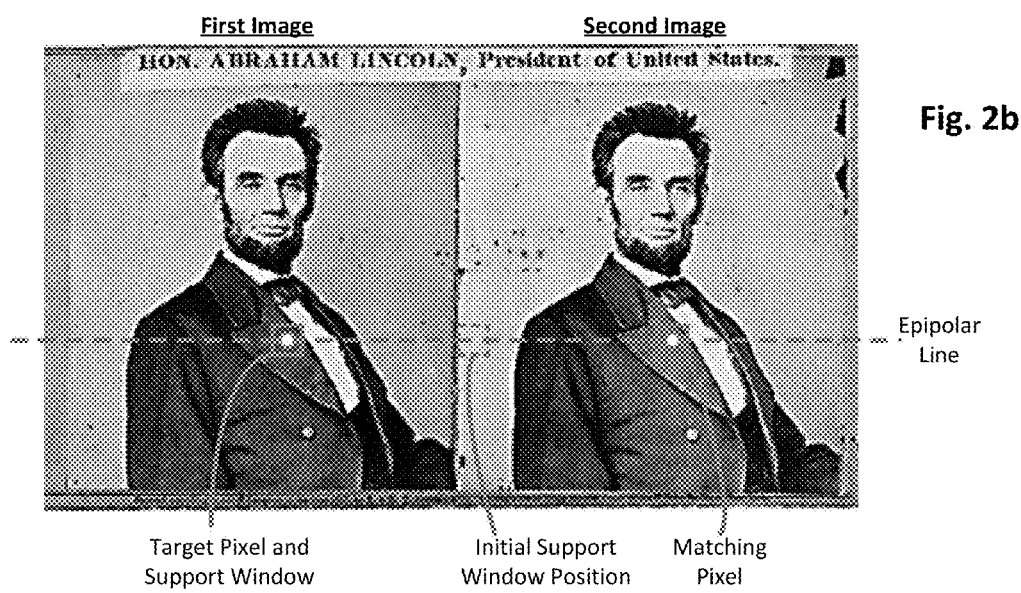

FIG. 2a generally illustrates a stereo algorithm that can be configured in accordance with an embodiment of the present invention. As can be seen, the algorithm includes a rectification process, a disparity extraction (or block matching) process, and a depth extraction process. Rectification is the process of aligning the first and second stereo images so that their respective epipolar lines are horizontally aligned. Any number of known or custom techniques can be used to achieve rectification, such as two-dimensional warping and other such two-dimensional pixel alignment algorithms. Once the first and second images are rectified, the block matching process can commence. An example matching process is depicted in FIG. 2b. As can be seen, each target pixel on the first image is compared against all pixels along the epipolar line on the second image. As can further be seen, each pixel can be described or represented by its value, and may also be described by its surrounding pixels (generally depicted as the support window around the target pixel). The block matching algorithm can be configured, for example, to choose the match with the minimum cost, given a certain cost function. If the x-coordinate of the target point is x1, and the x-coordinate of the best match (inside the second image) is x2, then x1-x2 is the disparity for the target point. Points with larger disparities represent objects which are closer to the observer (e.g., stereo cameras). The output of the block matching algorithm is the disparity for each point of the first image. In an embodiment of the present invention, this matching process is carried out using LSH function, as will be discussed in further detail with reference to FIGS. 3a-b, 4a-c, and 5. Once the disparity extraction process is complete, depth extraction based on the detected disparities can be carried out as commonly done (e.g., depth map and three-dimensional rendering).

Figure 3A:
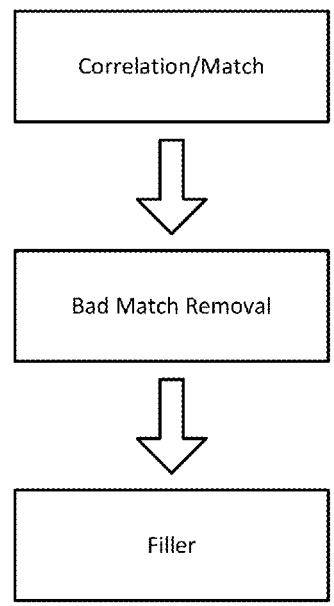
FIGS. 3a-b generally illustrate block matching stages of a stereo algorithm, in accordance with an embodiment of the present invention.

As will be appreciated in light of this disclosure, the block matching algorithm is computationally expensive, as it consumes a significant amount of central processing unit (CPU) cycle time, which in turn consumes a significant amount of power. FIG. 3a generally illustrates block matching stages of a stereo algorithm, in accordance with an embodiment of the present invention. As can be seen, this example block matching algorithm generally includes a matching/correlation process configured for estimation of the disparities, a bad match removal process configured to remove points of low-confidence disparity estimations, and a filler process configured to complete the disparity map by filling holes/gaps between known pixels. As can be further seen, the overall block matching algorithm need not be iterative like many other matching algorithms; rather, a single pass through these main processes can be used to correlate first and second images of a stereo image pair, so as to allow for depth extraction. The stereo pipe of other embodiments may be configured differently, and the claimed invention is not intended to be limited to any particular one.

The match/correlation function can be implemented with any number of suitable functions. In one example embodiment of the present invention, the correlation function is implemented with a Local Binary Pattern or Census transform, and uses a Hamming distance between the neighborhoods of pixels to define similarity. In particular, a Hamming distance is computed between the descriptor for a given point in the first image and all the descriptors for the points on the same line ("epipolar line") in the second image. Then, the point from the second image which has the minimal Hamming distance can be chosen as the best match for the target point from the first image. Note that 'point' or 'pixel' may be used interchangeably herein, but 'point' may be broader in nature.

Figure 3B:
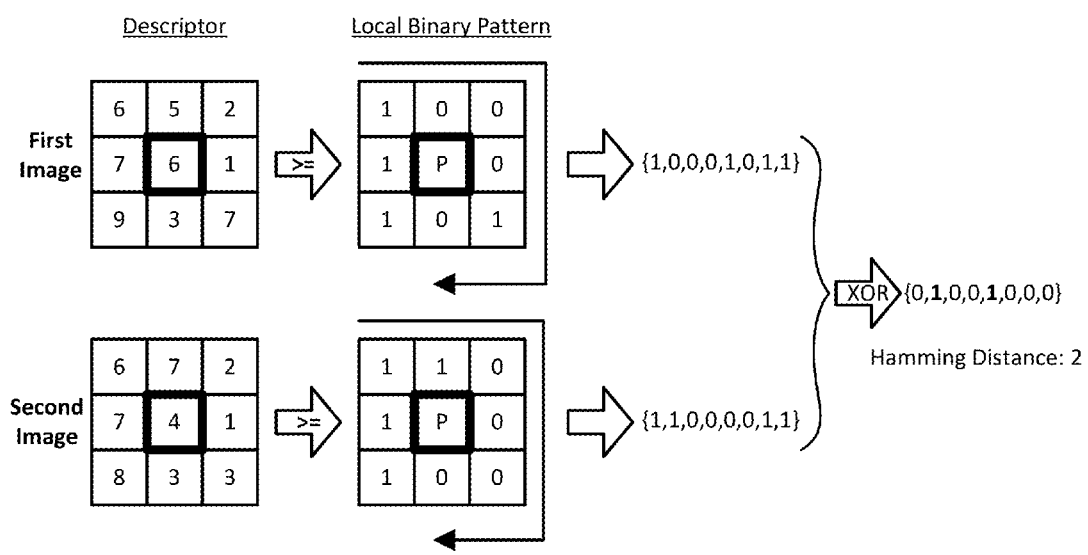

FIG. 3b illustrates a specific example embodiment that employs a Local Binary Pattern (LBP) or Census transforms to correlate a stereo image pair. As can be seen, the target point of the first image has a value (or descriptor) of 6, and its support window includes neighboring points having values of 6, 5, 2, 1, 7, 3, 9, and 7 (clock-wise, from upper left corner). Running the LBP transform on this target point, for instance, yields the bit map to the right, wherein if a neighboring point value is greater than or equal to the target point P value then the corresponding bit location is set to 1, and if a neighboring point value is less than the target point P value then the corresponding bit location is set to 0. In this example embodiment, the bits are processed in a clock-wise fashion, from the upper left corner, but other embodiments may process the bits differently (e.g., row by row from left to right such as with the Census transform, etc), so long as the bit processing is performed consistently throughout the correlation process. As can be further seen with reference to FIG. 3b, the LBP transform can also be run on each second image point that falls on the epipolar line associated with the first image target point. The second image point depicted in this example case has a value of 4, and its support window includes neighboring points having values of 6, 7, 2, 1, 3, 3, 8, and 7 (clock-wise, from upper left corner). Running the LBP transform on this second image point yields the bit map to the right, in a similar fashion as previously described with respect to the first image target point. As can be further seen with reference to FIG. 3b, each of the first and second image bitmaps effectively provide a vector (string of bits), which in this example are extracted from the map in a clock-wise manner, starting from the upper left corner. The Hamming distance between the two vectors can then be computed. This process can be repeated to find the smallest Hamming distance (and therefore best match) comparison set, until each first image pixel is correlated to its matching second image pixel. The 8-bit LBP transform is used as an illustrative example. In other embodiments, the window for extracting the LBP information may be larger (e.g., a 32-bit descriptor for each pixel), and many such windows can be aggregated to provide a neighborhood descriptor for each pixel in order to improve the correlation quality. In one specific example embodiment, a 32-bit LBP is aggregated for a 7×7 support window for each pixel, giving a 1568-bit descriptor for each pixel which needs to be paired with the best match from the other image. Such a procedure may be suitable, for instance, in applications where a high-quality match is desired.

As previously explained, however, computing the Hamming distance between the vector for a given target point from the first image, and each of the vectors for all the points on the epipolar line from the second image, is computationally expensive. This is true even if the Hamming distance is only computed for points with x2<x1. Thus, and in accordance with an embodiment of the present invention, such complete vector Hamming distance computations can be selectively executed such that only points which are likely to be the best match are subjected to full Hamming distance computations. The can be achieved using LSH functions, in accordance with an embodiment of the present invention.

Assume, for example, that the neighborhood or support window descriptors being processed are 1568 bits long. In more detail, assume every pixel has a descriptor that is a 32-bit vector (which may be generally referred to as a point descriptor). For a similarity score, the Hamming distance of the descriptors in the X*X (e.g., 7*7 in this example case, or 49 point descriptors) neighborhood around the pixel (or so-called support window) can be aggregated, in accordance with one embodiment. This is equivalent to calculating the Hamming distance over a 32*7*7=1,568 bit vector (which may be generally referred to as a neighborhood descriptor). To build a single Locality Sensitive Hash (LSH) function in accordance with one such embodiment, K coordinates can be randomly selected from the full vector (1568-bit, in this example case), and the indicated bits are concatenated. This result will be the index into a hash table in which the x coordinates of the pixels are identified. Note that the full vector need not be actually constructed; rather, the sub-set of K bits directly can be read directly from the images, in accordance with some embodiments.

So, continuing with the specific example of a 1568-bit vector (or descriptor, since the vector need not be explicitly constructed), a sub-set of those bits is randomly selected, such as bits 178, 399, 750, and 1301. Then, compare only these bits from the vector for the first image target point to the corresponding bits from all the vectors from the epipolar line of the second image. If we find a match in all four positions (points 178, 399, 750, and 1301), then that second image point is a likely candidate to be the best match for the first image target point. At that point, a full match may be computed on that point, wherein the entire 1568-bit Hamming distance is computed. Chances are that only a few points from the epipolar line will have a match in all four positions (points 178, 399, 750, and 1301), and the number of full computations will therefore also likely be small. The sub-set of points (178, 399, 750, and 1301) can be used to define a hash function. The value of this function, for any 1568-bit vector, is the concatenation of the bits at these indices. So, for example, if bit 178 is 1, bit 399 is 0, and bits 750 and 1301 are 1, then the value of the hash function is 1011 (binary), or 11 (decimal). In accordance with one such embodiment, the value of the hash function is computed for all the points on the epipolar line from the second image, and then the x-coordinate of all those points are placed into the hash table at the offset which is the value of the hash function for that point. So, for instance, if the value of the hash function for a given target point (from the first image) is 11, then the hash table entry at offset (or index) 11 will identify the coordinates of all the points from the second image (on the same epipolar line) that have the same value of the hash function. The full Hamming distance computation can then be carried out on this sub-set of points, thereby providing a much faster correlation process.

Now, if only one hash function is used, the risk of missing the true best match may be higher than desired or otherwise acceptable, since a very good match may happen to not have the same values of sub-set of selected bits (in this example, that at indices 178, 399, 750, and 1301). So, in accordance with some embodiments, a family of L hash functions is provided, wherein each represents a different sub-set of vector bits. The L hash tables may be constructed in the same manner as previously described. If even one of the hash functions gives a match, then a full Hamming distance computation can be computed on the point found. Out of all the points checked, the one with the minimal Hamming distance can be selected, in a similar fashion as with the full computation algorithm.

Example Architecture

FIGS. 4*a-b* demonstrate another example of a correlation search for a stereo algorithm using LSH functions, in accordance with an embodiment of the present invention. As can be seen, the vectors generated by the LBP or Census transform from FIGS. 3*a-b* are received, and a sub-set of bits from each of those vectors are selected to provide a hashing function as previously explained. In this example case, the vectors are only 8 bits long, and the sub-set of bits chosen are bits 2, 4, and 8. The number of bits in this sub-set is generally referred to as K. Note that the hash function may also be run on pixel descriptor as previously indicated, and that the local binary pattern or vector need not be actually constructed, in accordance with some embodiments.

As can be seen in FIG. 4*b*, the value of the hash function is computed for all the points on the epipolar line from the second image, and then the x-coordinate of all those points are placed into the hash table at the offset which is the value of the hash function for that point. So, in this specific example case: a hash value of 0,0,0 corresponds to the x-coordinate of point 41; a hash value of 0,0,1 corresponds to the x-coordinate of points 30, 39, 44, and 64; a hash value of 0,1,0 corresponds to the x-coordinate of points 21 and 55; . . . a hash value of 1,1,0 corresponds to the x-coordinate of points 1-18, 23-29, . . . , and 255; and a hash value of 1,1,1 corresponds to the x-coordinate of points 19, 31, . . . , and 256. Note that some hash functions (indices) may not be associated with any x-coordinates, and some may be associated with multiple x-coordinates. In any case, once the value of the hash function for a given target point (from the first image) is computed, then the hash table entry associated with that hash function (index) can be queried to identify the x-coordinates of any points from the second image (on the same epipolar line) that have the same value hash function. The full Hamming distance computation can then be carried out on this sub-set of points. As can be further seen with respect to FIG. 4*b, a* family of L hash functions is provided, wherein each represents a different sub-set of vector bits. Hash tables #2 through L can be constructed in the same manner as hash table #1 (except that each has a unique hash function). As previously explained, multiple hash tables increases the probability that a proper match will be found.

Figure 5:
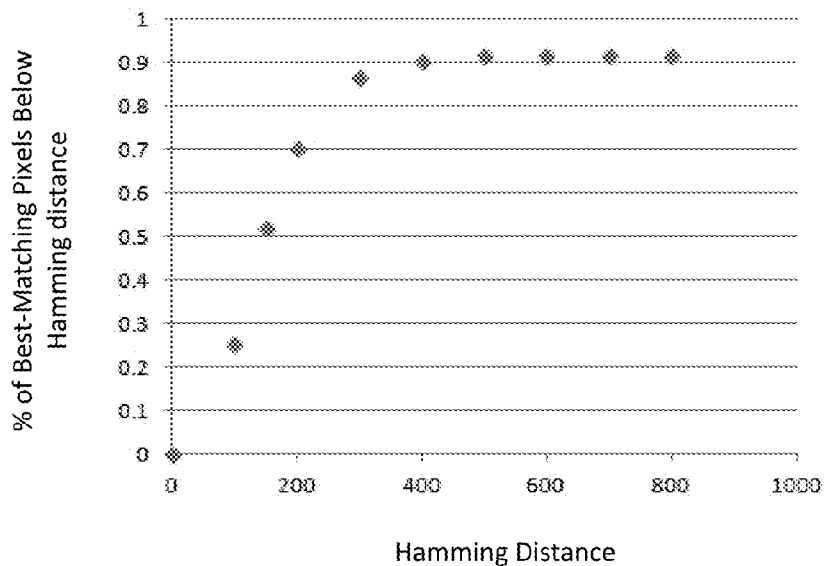
FIG. 5 illustrates a graph Hamming distance relative to the percentage of best-matching pixels below this distance, in accordance with an embodiment of the present invention.

As will be appreciated in light of this disclosure, the examples provided herein use three or four bits (K=3 or 4) for the hash functions for ease of description; in actuality, this variable parameter K will likely be larger. As will be further appreciated in light of this disclosure, parameters K and L can be chosen to give the best quality of the resulting output, which will vary from one embodiment to the next, and the claimed invention is not intended to be limited to any particular range of such parameters. FIG. 5 illustrates a graph of Hamming distance relative to the percentage of best-matching pixels below this distance, in accordance with an embodiment of the present invention. As can be seen, the greater the Hamming distance, the greater the percentage of best-matching pixels below that distance. In more detail, the graph indicates that a so-called typical Hamming distance in the example stereo image from which the graph is made is about 300-400 because about 80%-90% of the points have this Hamming distance or lower (other embodiments may have different thresholds for qualifying a typical Hamming distance, such as 51% or 75% of points). As will be appreciated in light of this disclosure, the Hamming distance can vary with different camera systems and depends on factors such as camera quality, pixel resolution, noise, etc. This typical Hamming distance can be treated as R in FIG. 1 and in the Equations 1 and 2 previously provided. To this end, note that L and K can be selected in accordance with this approach in some embodiments, as well as a trial and error approach in accordance with other embodiments, as will be appreciated in light of this disclosure.

Thus, and in accordance with an embodiment, for every LSH function value, a line from the second image is inserted into the hash table (e.g., scan each pixel in the line and insert its x-coordinate location associated with the index indicated by the LSH function). In some embodiments, a number of pixels may be mapped to the same index, so a maximum of B pixels can be saved for each index (wherein additional pixels can be ignored, if they exist). After that hash table is built, each pixel from the first image line can be queried into that table, in order to find the value of the LSH function for that pixel thereby enabling a look up of pixels from the second image line that have the same index in the hash table. To find the best pixel match between and among these candidates, a full correlation function can then be run only on them. The LSH function assisted correlation process in accordance with one such embodiment is described here in pseudo code:

```
For each line Y
    For each LSH_i function out of L
        Insert the second image Y line into the LSH_i table
        For each pixel in the first image
            Find the LSH_i index
            Do full correlation with all the pixels in that index and take
            the best one
        End
    End
End
```

Figure 4C:
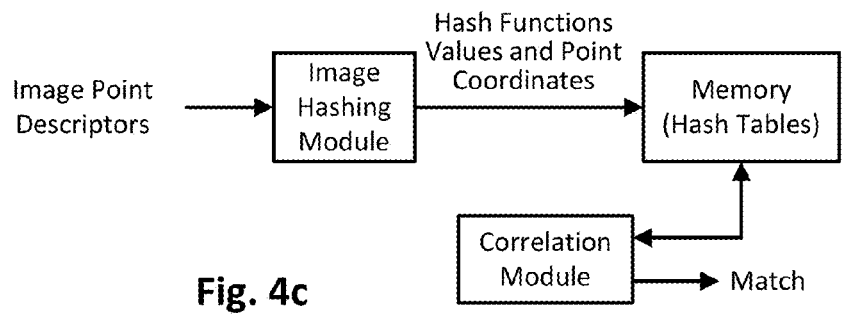
FIG. 4c illustrates a stereo image correlation device configured in accordance with an embodiment of the present invention.

FIG. 4c illustrates a stereo image correlation device configured in accordance with an embodiment of the present invention. As can be seen, the device includes an image hashing module, a correlation module, and a memory having one or more hash tables stored therein. The device receives point descriptors (e.g., pixel descriptors or vectors or any derivatives thereof) associated with a stereo image pair, and identifies the best match between a given target image point of one image and the various image points on the corresponding epipolar line of the other image.

The image hashing module can be programmed or otherwise configured for receiving descriptors of image points of a first image, and for applying a first hash function to a sub-set of bits from each descriptor of the image point of the first image to provide a first hash function value, as variously described herein. The image hashing module may be further configured for receiving a multi-bit descriptor of an image point of a second image, and for applying the first hash function to the sub-set of bits from the descriptor of the image point of the second image to provide a second hash function value, the first and second images forming a stereo image pair.

Note that reference herein to a first image hashing module and a second image hashing module is not intended to imply two distinct modules. For instance, in some cases, those first and second modules may be the same module. In some specific embodiments, the image hashing module(s) is configured to concatenate a sub-set of bits of a given descriptor to form a binary value that corresponds to an offset into the corresponding hash table. As will be further appreciated, the image hashing module can be configured for processing all image points from an epipolar line of the first image into corresponding locations of the hash table(s), in accordance with some embodiments.

The memory can be programmed or otherwise configured for storing one or more hash tables, each table having locations for storing coordinates of the image points of the first and/or second images (stereo image pair), and each location can be identified by a corresponding hash function value. The memory can be implemented using any suitable memory technology, and may be discrete or on-chip or embedded memory, for example. Note that data from both the first and second images does not need to be stored in the memory. Rather, data of one image (e.g., second image) can be stored, and data from the other image (e.g., first image) can be queried against that stored data. Note that the use herein of 'first' and 'second' to denote images of a stereo image pair is not intended to implicate any particular order or limitation of the stereo image pair. Either image of the stereo pair can be the first image, and the other will be the second image.

The correlation module can be programmed or otherwise configured for querying the hash tables in the memory using the corresponding hash function values to identify coordinate of any image points of the first image that may be a match to a given image point of the second image. In some cases, if the correlation module identifies any image point coordinates of the first image that may be a match to the image point of the second image, the correlation module may be further configured to perform an additional correlation computation to confirm the match (e.g., using full vectors, Hamming distances, etc, as previously described).

As will be appreciated in light of this disclosure, the various functional modules described herein can be implemented, for example, in any suitable programming language (e.g., C, C++, objective C, custom or proprietary instruction sets, etc), and encoded on one or more machine readable mediums, that when executed by one or more processors, carry out graphics processing as described herein. Other embodiments can be implemented, for instance, with gate-level logic or an application specific integrated circuit (ASIC) or chip set or other such purpose built logic, or a microcontroller having input/output capability (e.g., inputs for receiving user inputs and outputs for directing other components) and a number of embedded routines for carrying out graphics workload processing, including stereo correlation as variously described herein. In short, the various functional modules can be implemented in hardware, software, firmware, or a combination thereof. One specific embodiment is implemented as a system-on-chip, which includes embedded software routines and/or hardware so as to allow for execution of an LSH-assisted stereo correlation scheme as variously described herein.

A number of variations will be apparent in light of this disclosure. For instance, some embodiments may implement techniques to reduce the number of potential matches for each pixel. For example, as previously explained, if the x-coordinate of a target point is x1, and the x-coordinate of the best match (inside the second image) is x2, then x1-x2 is the disparity for that target point. To this end, there is a constraint that can be exploited so as to reduce the number of computations, in accordance with an embodiment. In more detail, assume the so-called first image is the left image and the so-called second image is the right image. In such example cases, since the second image is taken by a camera which is shifted to the right, the image contents will be displaced to the left, and therefore, for any real match, x1>x2 must be true (disparity must be positive) in such cases. This means that there is only need to compute Hamming distances for points in the second (right) image with a smaller x coordinate than the target point of the first (left) image. Thus, if the x-coordinate $X_{Right}$ found in the hash table is bigger than $X_{Left}$, it can be skipped (no need to subject to full vector processing). Also, since a full second image line can be inserted into the hash table in some embodiments, the disparity range is not limited (i.e., there is no maximum value for $X_{Left}-X_{Right}$). Thus, if information that can help limit the disparity is available, or if it is desirable to limit disparity to, for example, 64 or 256, then checking of those pixels that exceed the range can be skipped. As will be appreciated, the same principles apply if the images are considered in the reverse (where the so-called first image is the right image and the so-called second image is the left image), wherein requirement for a negative disparity and/or compliance with a maximum negative disparity could be constraints for proceeding with additional computations (e.g., full Hamming distance computations). For purpose herein, the term 'positive disparity' will be assumed to include any such variations that effectively implement constraints as described. Also, the parameters L, K, and B can be chosen, for instance, according to the nature of the system and the noise level. The effect of the noise level is demonstrated, for example, in FIG. 5. As will be appreciated in light of this disclosure, there is some tradeoff between output quality and performance. In particular, small K and large L will tend to increase the chance that the best match will be found but may also increase the number of points with that will be subjected to full computation thereby potentially causing a decrease in performance. Likewise, large K and small L will tend to decrease the chance that the best match will be found but may also decrease the number of points with that will be subjected to full computation thereby potentially causing an increase in performance. In some example embodiments, B can be chosen according to L and K such that the probability of a good match will not decrease.

Example System

Figure 6:
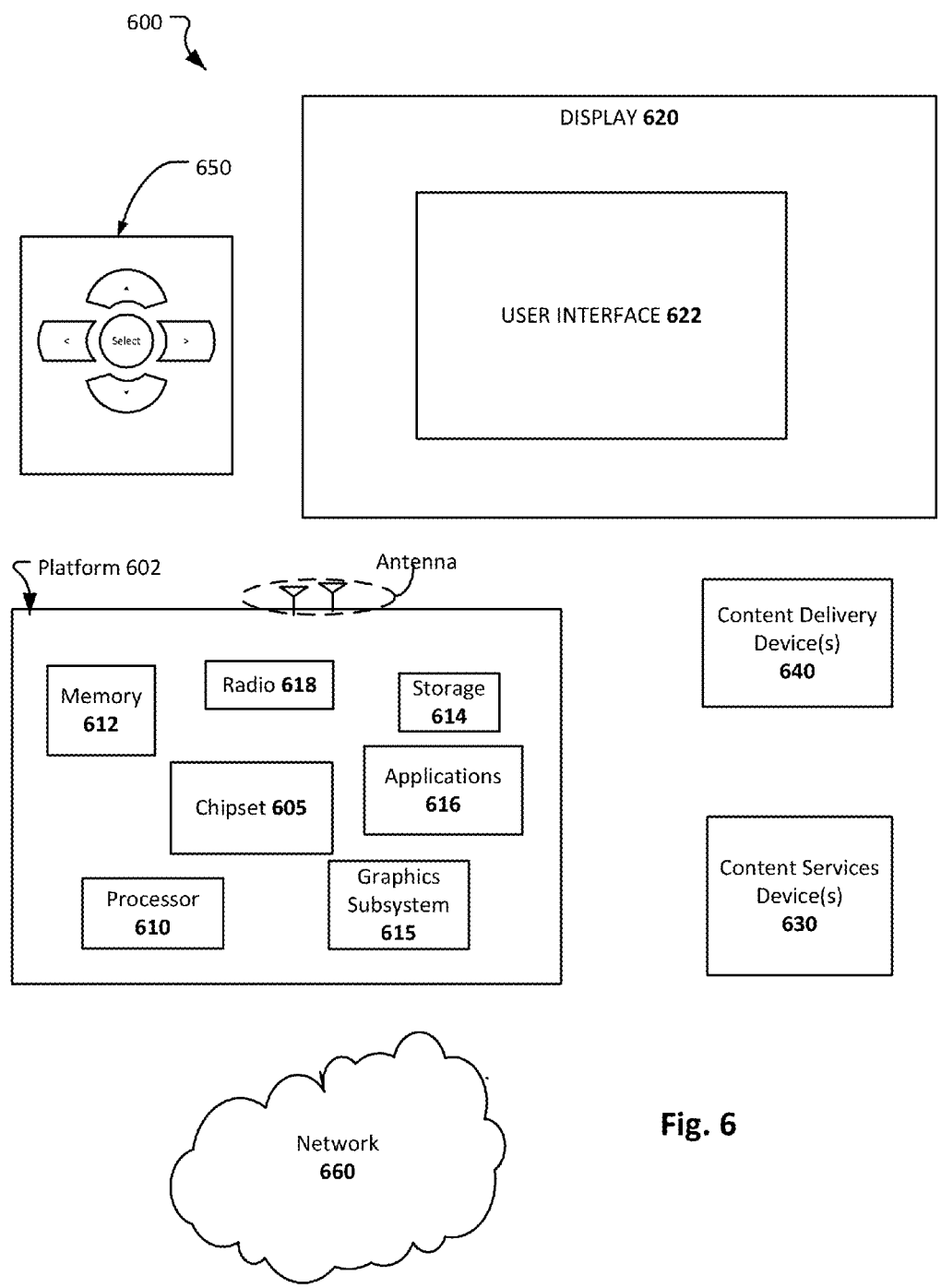
FIG. 6 illustrates a media system configured in accordance with an embodiment of the present invention.

FIG. 6 illustrates an example system 600 that may carry out LSH-assisted stereo correlation as described herein, in accordance with some embodiments. In some embodiments, system 600 may be a media system although system 600 is not limited to this context. For example, system 600 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations.

In some embodiments, system 600 comprises a platform 602 coupled to a display 620. Platform 602 may receive content from a content device such as content services device(s) 630 or content delivery device(s) 640 or other similar content sources. A navigation controller 650 comprising one or more navigation features may be used to interact with, for example, platform 602 and/or display 620. Each of these example components is described in more detail below.

In some embodiments, platform 602 may comprise any combination of a chipset 605, processor 610, memory 612, storage 614, graphics subsystem 615, applications 616 and/or radio 618. Chipset 605 may provide intercommunication among processor 610, memory 612, storage 614, graphics subsystem 615, applications 616 and/or radio 618. For example, chipset 605 may include a storage adapter (not depicted) capable of providing intercommunication with storage 614.

Processor 610 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 610 may comprise dual-core processor(s), dual-core mobile processor(s), and so forth. Memory 612 may be implemented, for instance, as a volatile memory device such as, but not limited to, a Random Access Memory (RAM), Dynamic Random Access Memory (DRAM), or Static RAM (SRAM). Storage 614 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 614 may comprise technology to increase the storage performance enhanced protection for valuable digital media when multiple hard drives are included, for example.

Graphics subsystem 615 may perform processing of images such as still or video for display. Graphics subsystem 615 may be a graphics processing unit (GPU) or a visual processing unit (VPU), for example. An analog or digital interface may be used to communicatively couple graphics subsystem 615 and display 620. For example, the interface may be any of a High-Definition Multimedia Interface, DisplayPort, wireless HDMI, and/or wireless HD compliant techniques. Graphics subsystem 615 could be integrated into processor 610 or chipset 605. Graphics subsystem 615 could be a stand-alone card communicatively coupled to chipset 605. The graphics and/or video processing techniques described herein may be implemented in various hardware architectures. For example, LSH-assisted stereo correlation functionality as provided herein may be integrated within a graphics and/or video chipset. Alternatively, a discrete security processor may be used. In still another embodiment, the graphics and/or video functions including LSH-assisted stereo correlation may be implemented by a general purpose processor, including a multi-core processor.

Radio 618 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 618 may operate in accordance with one or more applicable standards in any version.

In some embodiments, display 620 may comprise any television or computer type monitor or display. Display 620 may comprise, for example, a liquid crystal display (LCD) screen, electrophoretic display (EPD or liquid paper display, flat panel display, touch screen display, television-like device, and/or a television. Display 620 may be digital and/or analog. In some embodiments, display 620 may be a holographic or three-dimensional display. Also, display 620 may be a transparent surface that may receive a visual projection. Such projections may convey various forms of information, images, and/or objects. For example, such projections may be a visual overlay for a mobile augmented reality (MAR) application. Under the control of one or more software applications 616, platform 602 may display a user interface 622 on display 620.

In some embodiments, content services device(s) 630 may be hosted by any national, international and/or independent service and thus accessible to platform 602 via the Internet or other network, for example. Content services device(s) 630 may be coupled to platform 602 and/or to display 620. Platform 602 and/or content services device(s) 630 may be coupled to a network 660 to communicate (e.g., send and/or receive) media information to and from network 660. Content delivery device(s) 640 also may be coupled to platform 602 and/or to display 620. In some embodiments, content services device(s) 630 may comprise a cable television box, personal computer, network, telephone, Internet enabled devices or appliance capable of delivering digital information and/or content, and any other similar device capable of unidirectionally or bidirectionally communicating content between content providers and platform 602 and/display 620, via network 660 or directly. It will be appreciated that the content may be communicated unidirectionally and/or bidirectionally to and from any one of the components in system 600 and a content provider via network 660. Examples of content may include any media information including, for example, video, music, graphics, text, medical and gaming content, and so forth.

Content services device(s) 630 receives content such as cable television programming including media information, digital information, and/or other content. Examples of content providers may include any cable or satellite television or radio or Internet content providers. The provided examples are not meant to limit the claimed invention. In some embodiments, platform 602 may receive control signals from navigation controller 650 having one or more navigation features. The navigation features of controller 650 may be used to interact with user interface 622, for example. In some embodiments, navigation controller 650 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 650 may be echoed on a display (e.g., display 620) by movements of a pointer, cursor, focus ring, or other visual indicators displayed on the display. For example, under the control of software applications 716, the navigation features located on navigation controller 650 may be mapped to virtual navigation features displayed on user interface 622, for example. In some embodiments, controller 650 may not be a separate component but integrated into platform 602 and/or display 620. Embodiments, however, are not limited to the elements or in the context shown or described herein, as will be appreciated.

In some embodiments, drivers (not shown) may comprise technology to enable users to instantly turn on and off platform 602 like a television with the touch of a button after initial boot-up, when enabled, for example. Program logic may allow platform 602 to stream content to media adaptors or other content services device(s) 630 or content delivery device(s) 640 when the platform is turned "off." In addition, chip set 605 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card.

In various embodiments, any one or more of the components shown in system 600 may be integrated. For example, platform 602 and content services device(s) 630 may be integrated, or platform 602 and content delivery device(s) 640 may be integrated, or platform 602, content services device(s) 630, and content delivery device(s) 640 may be integrated, for example. In various embodiments, platform 602 and display 620 may be an integrated unit. Display 620 and content service device(s) 630 may be integrated, or display 620 and content delivery device(s) 640 may be integrated, for example. These examples are not meant to limit the claimed invention.

In various embodiments, system 600 may be implemented as a wireless system, a wired system, or a combination of both. When implemented as a wireless system, system 600 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 600 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 602 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner (e.g., using LSH-assisted stereo correlation as described herein). The embodiments, however, are not limited to the elements or context shown or described in FIG. 6.

Figure 7:
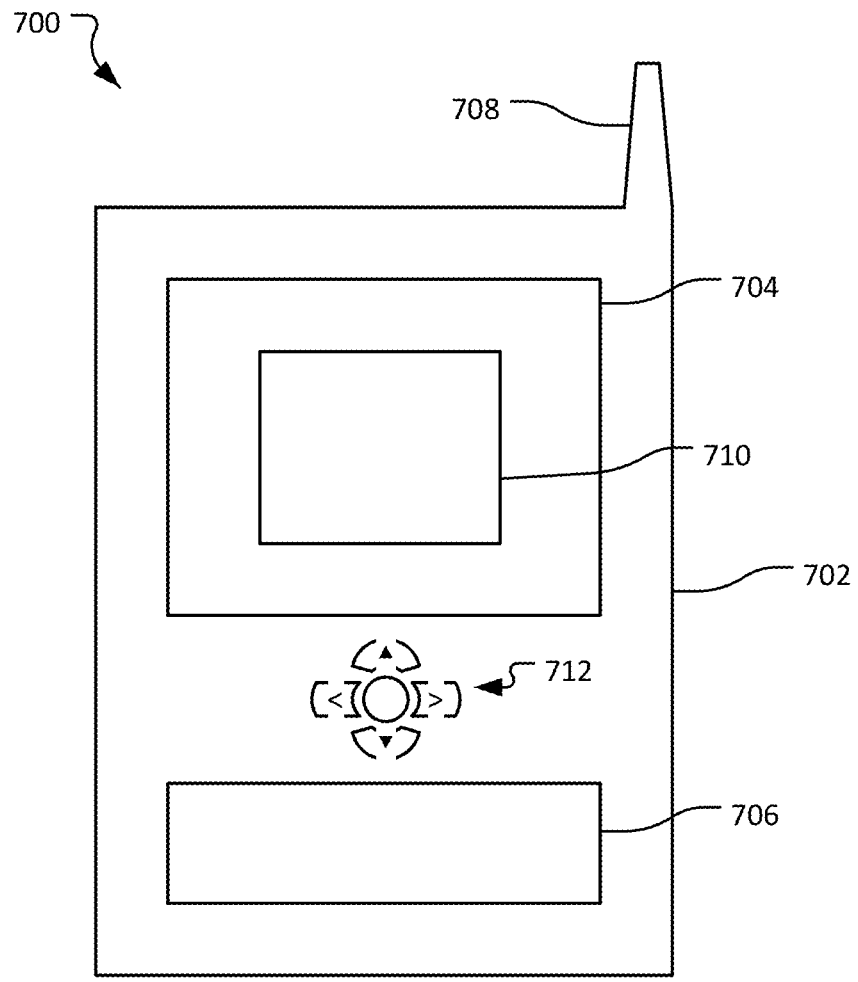
FIG. 7 illustrates a mobile computing system configured in accordance with an embodiment of the present invention

As described above, system 600 may be embodied in varying physical styles or form factors. FIG. 7 illustrates embodiments of a small form factor device 700 in which system 600 may be embodied. In some embodiments, for example, device 700 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 7, device 700 may comprise a housing 702, a display 704, an input/output (I/O) device 706, and an antenna 708. Device 700 also may comprise navigation features 712. Display 704 may comprise any suitable display unit for displaying information appropriate for a mobile computing device. I/O device 706 may comprise any suitable I/O device for entering information into a mobile computing device. Examples for I/O device 706 may include an alphanumeric keyboard, a numeric keypad, a touch pad, input keys, buttons, switches, rocker switches, microphones, speakers, voice recognition device and software, and so forth. Information also may be entered into device 700 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present invention. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or displays. The embodiments are not limited in this context.

Numerous embodiments will be apparent, and features described herein can be combined in any number of configurations. One example embodiment of the present invention provides a stereo image correlation method. The method includes receiving a multi-bit descriptor of an image point of a first image, and applying a first hash function to a sub-set of bits from the descriptor of the image point of the first image to provide a first hash function value. Note that the multi-bit descriptor may be, for example, a direct or indirect representation of a given pixel or other image point, and may or may not include information with respect to connectivity to that point and/or neighboring points, and therefore may be, for instance, a point descriptor or a neighborhood descriptor. The method further includes storing a coordinate of the image point of the first image into a location of a first hash table, the location identified by the first hash function value. The method continues with receiving a multi-bit descriptor of an image point of a second image, the first and second images forming a stereo image pair, and applying the first hash function to the sub-set of bits from the descriptor of the image point of the second image to provide a second hash function value. The method further includes querying the first hash table using the second hash function value to identify a coordinate of an image point of the first image that may be a match to the image point of the second image. In some cases, applying the first hash function comprises concatenating the sub-set of bits to form a binary value that corresponds to an offset into the first hash table. In some cases, the receiving, applying and storing with respect to the first image are repeated for all image points from an epipolar line of the first image. In some cases, if the querying identifies any image point coordinates of the first image that may be a match to the image point of the second image, the method further comprises performing an additional correlation computation to confirm the match. In some such cases, the additional correlation computation to confirm the match is carried out using all the bits of the corresponding multi-bit descriptor. In other such cases, the additional correlation computation to confirm the match is carried out only if the querying indicates positive disparity between corresponding coordinates of the first and second images. In other such cases, the additional correlation computation to confirm the match is carried out only if the querying indicates a disparity between corresponding coordinates of the first and second images that is within a given maximum disparity. In some cases, the method includes: applying a second hash function to another sub-set of bits from the descriptor of the image point of the first image to provide a third hash function value; storing a coordinate of the image point of the first image into a location of a second hash table, the location identified by the third hash function value; applying the second hash function to the another sub-set of bits from the descriptor of the image point of the second image to provide a fourth hash function value; and querying the second hash table using the fourth hash function value to identify a coordinate of an image point of the first image that may be a match to the image point of the second image. In one such case, the method repeats with respect to one or more additional hash functions and corresponding hash tables. In some example cases, each image point is, for instance, a pixel and each descriptor is an x-bit vector. Another embodiment of the present invention provides a computer readable medium having instructions encoded thereon that, when executed by one or more processors, cause a stereo image correlation process to be carried out. In some such cases, the process is as variously described in this paragraph.

Another embodiment of the present invention provides a stereo image correlation device. The device includes a first image hashing module configured for receiving a multi-bit descriptor of an image point of a first image, and for applying a first hash function to a sub-set of bits from the descriptor of the image point of the first image to provide a first hash function value. The device further includes a first hash table having a location for storing a coordinate of the image point of the first image, the location identified by the first hash function value. The device further includes a second image hashing module configured for receiving a multi-bit descriptor of an image point of a second image, and for applying the first hash function to the sub-set of bits from the descriptor of the image point of the second image to provide a second hash function value, the first and second images forming a stereo image pair. The device further includes a correlation module configured for querying the first hash table using the second hash function value to identify a coordinate of an image point of the first image that may be a match to the image point of the second image. In some cases, in applying the first hash function, the first image hashing module is configured to concatenate the sub-set of bits to form a binary value that corresponds to an offset into the first hash table. In some cases, the first image hashing module is configured for processing all image points from an epipolar line of the first image into a corresponding location of the first hash table. In some cases, if the correlation module identifies any image point coordinates of the first image that may be a match to the image point of the second image, the device is further configured to perform an additional correlation computation to confirm the match. In one such case, the additional correlation computation to confirm the match is carried out using all the bits of the corresponding multi-bit descriptor. In another such case, the additional correlation computation to confirm the match is carried out only if the querying indicates positive disparity between corresponding coordinates of the first and second images. In another such case, the additional correlation computation to confirm the match is carried out only if the querying indicates a disparity between corresponding coordinates of the first and second images that is within a given maximum disparity. In some cases, the first image hashing module is further configured for applying a second hash function to another sub-set of bits from the descriptor of the image point of the first image to provide a third hash function value, and the device further includes a second hash table having a location for storing a coordinate of the image point of the first image, the location identified by the third hash function value. In some such cases, the second image hashing module is further configured for applying the second hash function to the another sub-set of bits from the descriptor of the image point of the second image to provide a fourth hash function value, and the correlation module is further configured for querying the second hash table using the fourth hash function value to identify a coordinate of an image point of the first image that may be a match to the image point of the second image. In some cases, the device further comprises one or more additional hash functions and corresponding hash tables. In some cases, each image point is a pixel and each descriptor is an x-bit vector. Numerous variations will be apparent. For instance, another embodiment provides a media processing system that includes a device as variously defined in this paragraph. Another embodiment provides a mobile computing system that includes the media processing system. Another embodiment provides a system-on-chip that includes the device as variously defined in this paragraph.

The foregoing description of example embodiments of the invention has been presented for the purposes of illustration and description. It is not intended to be exhaustive or to limit the invention to the precise forms disclosed. Many modifications and variations are possible in light of this disclosure. It is intended that the scope of the invention be limited not by this detailed description, but rather by the claims appended hereto.

What is claimed is:

1. A stereo image correlation method, comprising:
receiving a multi-bit descriptor of an image point of a first image;
applying a first hash function to a sub-set of bits from the descriptor of the image point of the first image to provide a first hash function value;
storing a coordinate of the image point of the first image into a location of a first hash table, the location identified by the first hash function value;
receiving a multi-bit descriptor of an image point of a second image, the first and second images forming a stereo image pair;
applying the first hash function to the sub-set of bits from the descriptor of the image point of the second image to provide a second hash function value; and
querying the first hash table using the second hash function value to identify a coordinate of an image point of the first image that may be a match to the image point of the second image.

2. The method of claim 1 wherein applying the first hash function comprises concatenating the sub-set of bits to form a binary value that corresponds to an offset into the first hash table.

3. The method of claim 1 wherein the receiving, applying and storing with respect to the first image are repeated for all image points from an epipolar line of the first image.

4. The method of claim 1 wherein if the querying identifies any image point coordinates of the first image that may be a match to the image point of the second image, the method further comprises performing an additional correlation computation to confirm the match.

5. The method of claim 4 wherein the additional correlation computation to confirm the match is carried out using all the bits of the corresponding multi-bit descriptor.

6. The method of claim 4 wherein the additional correlation computation to confirm the match is carried out only if the querying indicates positive disparity between corresponding coordinates of the first and second images.

7. The method of claim 4 wherein the additional correlation computation to confirm the match is carried out only if the querying indicates a disparity between corresponding coordinates of the first and second images that is within a given maximum disparity.

8. The method of claim 1 further comprising:
applying a second hash function to another sub-set of bits from the descriptor of the image point of the first image to provide a third hash function value;
storing a coordinate of the image point of the first image into a location of a second hash table, the location identified by the third hash function value;
applying the second hash function to the another sub-set of bits from the descriptor of the image point of the second image to provide a fourth hash function value; and
querying the second hash table using the fourth hash function value to identify a coordinate of an image point of the first image that may be a match to the image point of the second image.

9. The method of claim 8 wherein the method repeats with respect to one or more additional hash functions and corresponding hash tables.

10. The method of claim 1 wherein each image point is a pixel and each descriptor is an x-bit vector.

11. A non-transitory computer readable medium having instructions encoded thereon that, when executed by one or more processors, cause a stereo image correlation process to be carried out, the process comprising:
receiving a multi-bit descriptor of an image point of a first image;
applying a first hash function to a sub-set of bits from the descriptor of the image point of the first image to provide a first hash function value;
storing a coordinate of the image point of the first image into a location of a first hash table, the location identified by the first hash function value;
receiving a multi-bit descriptor of an image point of a second image, the first and second images forming a stereo image pair;
applying the first hash function to the sub-set of bits from the descriptor of the image point of the second image to provide a second hash function value; and
querying the first hash table using the second hash function value to identify a coordinate of an image point of the first image that may be a match to the image point of the second image.

12. The computer readable medium of claim 11 wherein applying the first hash function comprises concatenating the sub-set of bits to form a binary value that corresponds to an offset into the first hash table.

13. The computer readable medium of claim 11 wherein the receiving, applying and storing with respect to the first image are repeated for all image points from an epipolar line of the first image.

14. The computer readable medium of claim 11 wherein if the querying identifies any image point coordinates of the first image that may be a match to the image point of the second image, the process further comprises performing an additional correlation computation to confirm the match.

15. The computer readable medium of claim 14 wherein the additional correlation computation to confirm the match is carried out using all the bits of the corresponding multi-bit descriptor.

16. The computer readable medium of claim 14 wherein the additional correlation computation to confirm the match is carried out only if the querying indicates positive disparity between corresponding coordinates of the first and second images.

17. The computer readable medium of claim 14 wherein the additional correlation computation to confirm the match is carried out only if the querying indicates a disparity between corresponding coordinates of the first and second images that is within a given maximum disparity.

18. The computer readable medium of claim 11, the process further comprising:
applying a second hash function to another sub-set of bits from the descriptor of the image point of the first image to provide a third hash function value;
storing a coordinate of the image point of the first image into a location of a second hash table, the location identified by the third hash function value;
applying the second hash function to the another sub-set of bits from the descriptor of the image point of the second image to provide a fourth hash function value; and
querying the second hash table using the fourth hash function value to identify a coordinate of an image point of the first image that may be a match to the image point of the second image.

19. The computer readable medium of claim 18 wherein the process repeats with respect to one or more additional hash functions and corresponding hash tables.

20. A stereo image correlation device, comprising:
a processor;
a first image hashing module executable on or by the processor, and configured to receive a multi-bit descriptor of an image point of a first image, and apply a first hash function to a sub-set of bits from the descriptor of the image point of the first image to provide a first hash function value;
a first hash table having a location for storing a coordinate of the image point of the first image, the location identified by the first hash function value;
a second image hashing module executable on or by the processor, and configured to receive a multi-bit descriptor of an image point of a second image and apply the first hash function to the sub-set of bits from the descriptor of the image point of the second image to provide a second hash function value, the first and second images forming a stereo image pair; and
a correlation module executable on or by the processor, and configured to query the first hash table using the second hash function value to identify a coordinate of an image point of the first image that may be a match to the image point of the second image.

21. The device of claim 20 wherein in applying the first hash function, the first image hashing module is configured to concatenate the sub-set of bits to form a binary value that corresponds to an offset into the first hash table.

22. The device of claim 20 wherein the first image hashing module is configured to process all image points from an epipolar line of the first image into a corresponding location of the first hash table.

23. The device of claim 20 wherein if the correlation module identifies any image point coordinates of the first image that may be a match to the image point of the second image, the device is further configured to perform an additional correlation computation to confirm the match.

24. The device of claim 23 wherein the additional correlation computation to confirm the match is carried out using all the bits of the corresponding multi-bit descriptor.

25. The device 23 wherein the additional correlation computation to confirm the match is carried out only if the querying indicates positive disparity between corresponding coordinates of the first and second images.

26. The device 23 wherein the additional correlation computation to confirm the match is carried out only if the querying indicates a disparity between corresponding coordinates of the first and second images that is within a given maximum disparity.

27. The device of claim 20 wherein the first image hashing module is further configured to apply a second hash function to another sub-set of bits from the descriptor of the image point of the first image to provide a third hash function value, the device further comprising:

a second hash table having a location for storing a coordinate of the image point of the first image, the location identified by the third hash function value;

wherein:

the second image hashing module is further configured to apply the second hash function to the another sub-set of bits from the descriptor of the image point of the second image to provide a fourth hash function value; and the correlation module is further configured to query the second hash table using the fourth hash function value to identify a coordinate of an image point of the first image that may be a match to the image point of the second image.

28. The device of claim 20 wherein the device further comprises one or more additional hash functions and corresponding hash tables.

29. A media processing system comprising the device of claim 20.

30. A mobile computing system comprising the media processing system of claim 29.

* * * * *

UNITED STATES PATENT AND TRADEMARK OFFICE
CERTIFICATE OF CORRECTION

PATENT NO.       : 8,879,829 B2                                                Page 1 of 1
APPLICATION NO.  : 13/658237
DATED            : November 4, 2014
INVENTOR(S)      : Reif et al.

It is certified that error appears in the above-identified patent and that said Letters Patent is hereby corrected as shown below:

In the Claims:

Column 18 line 66, Claim 25, delete "device 23" and insert -- device of claim 23 --.

Column 19 line 3, Claim 26, delete "device 23" and insert -- device of claim 23 --.

Signed and Sealed this
Twenty-eighth Day of April, 2015

Michelle K. Lee
*Director of the United States Patent and Trademark Office*

UNITED STATES PATENT AND TRADEMARK OFFICE
CERTIFICATE OF CORRECTION

PATENT NO.         : 8,879,829 B2                                          Page 1 of 1
APPLICATION NO.    : 13/658237
DATED              : November 4, 2014
INVENTOR(S)        : Reif et al.

It is certified that error appears in the above-identified patent and that said Letters Patent is hereby corrected as shown below:

Title Page, Item (72) Inventors, the Residence of Inventor Dror Reif, please delete "Be'er-Yacoov" and insert -- Be'er-Ya'akov --.

Signed and Sealed this
Twenty-sixth Day of May, 2015

Michelle K. Lee
*Director of the United States Patent and Trademark Office*